Dec. 14, 1965     J. E. HOGEL     3,223,105
PNEUMATIC CONTROL APPARATUS
Filed June 13, 1963
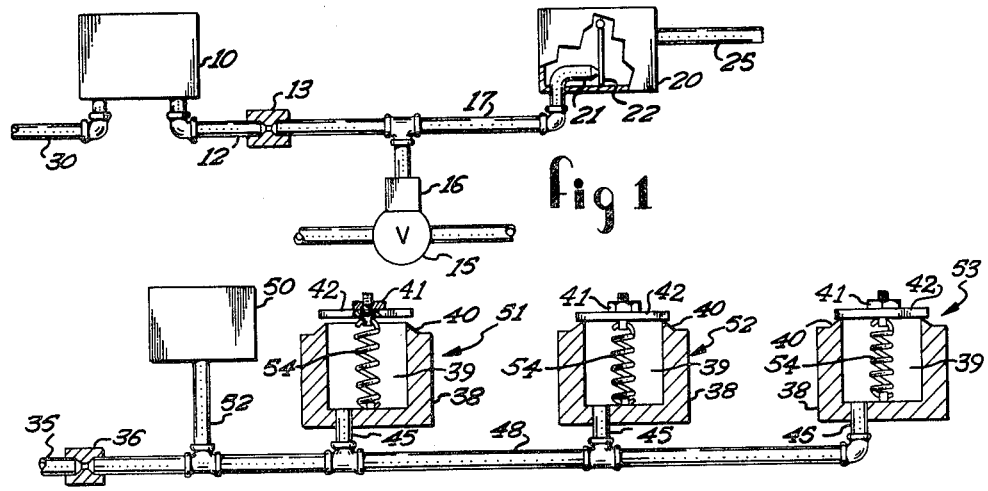
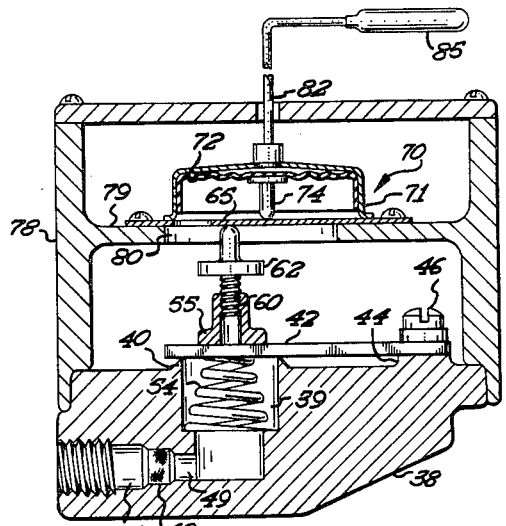
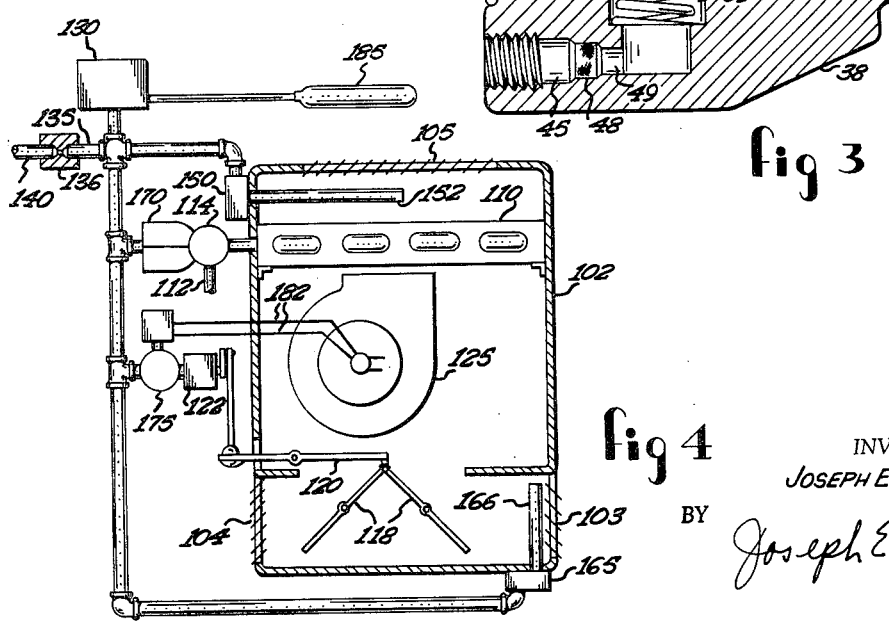
INVENTOR.
JOSEPH E. HOGEL
BY
Joseph E. Ryan
ATTORNEY

United States Patent Office 3,223,105
Patented Dec. 14, 1965

3,223,105
PNEUMATIC CONTROL APPARATUS
Joseph E. Hogel, River Grove, Ill., assignor to Honeywell Inc., a corporation of Delaware
Filed June 13, 1963, Ser. No. 287,710
6 Claims. (Cl. 137—85)

My invention relates to pneumatic control systems and more particularly to an improved pneumatic control system having simplified provision for primary, secondary or remote limiting control.

While pneumatic control apparatus or systems utilizing primary and secondary controls, or primary and limiting controls are well recognized, it is generally necessary to provide complex tubing connections or conduits to the respective controllers to operate the limiting devices from the branch pressure of a master controller. The present invention is directed to an improved and simplified pneumatic control system in which all of the controllers, primary and secondary, or master and limiting, are connected in a common conduit from a source beyond a restriction with the control apparatus which is to be operated thereby. This provides a simple one pipe configuration or apparatus in a pneumatic control circuit greatly simplifying the piping therein or providing the same type of operation presently obtained with conventional pneumatic control systems.

Therefore, it is an object of this invention to provide an improved pneumatic limit control system.

Another object of this invention is to provide a simplified pneumatic control system utilizing simplified piping in which secondary or limiting controls may be incorporated.

Another object of this invention is to provide in a pneumatic control system a simplified single pipe connection between all controllers.

These and other objects of this invention will become apparent from reading of the attached description together with the drawings wherein:

FIGURE 1 is a schematic disclosure of the conventional or prior art type pneumatic control system utilizing a master or primary and secondary or limit type controller in the operation of a control device;

FIGURE 2 is a schematic diagram of the improved pneumatic control system utilizing simplified bleed type devices employing the force balance principle;

FIGURE 3 is a schematic diagram of the controller or bleed type sensor force balance type and, FIGURE 4 is a schematic diagram of the improved control system or apparatus as applied to a unit ventilator type control.

The present or acknowledged method of effecting limiting or secondary control functions in pneumatic control circuits is shown schematically in FIGURE 1 in which a master controller 10 provides a branch output signal indicated by the conduit 12 and restriction 13 to a device to be actuated or indicated by the schematic configuration of the valve 15 having a pneumatic actuator 16 associated therewith. Also connected to the connected to the control circuit through the conduit 17 is a secondary or limiting control unit of the bleed type such as indicated by the block 20. This apparatus includes a nozzle 21 and flapper 22 operated by a suitable sensing apparatus, such as a rod and tube type thermal sensor, indicated by the tube 25. The master controller 10 receives a supply input from the supply conduit 30 which will provide the main pneumatic air supply for the control system. The master controller or primary controller 10, which is shown in block, would incorporate a suitable relay mechanism and sensing apparatus (not shown) so that the output pneumatic circuit or tubing 12 therefrom would have a pressure therein always controlled by the master controller, since the relay or associated valving is always operated from the associated sensing element of the master controller, whether it be manual or automatic. Thus the pressure in the branch line conduit 12 will always be effective or controlled by the controller 10 and will have in addition the control of the secondary or limiting device 20 superimposed thereon in the form of a bleed from the flapper nozzle connected thereto which would bleed the pressure down from that established in the branch line conduit to effect a limiting operation on the device to be actuated 15 when limiting is to be effected. This type of apparatus is generally limited to a single secondary controller and where additional apparatus of this type is required, a master and submaster type configuration with supply conduits connected thereto is required to provide suitable air output signals which can be controlled by the signal limiting controller. Therefore, the piping configurations become complex where more than two controllers are applied to a pneumatic control system.

In this type of system, the limiting controller is also not only adjusted to the closed position and inasmuch as it is in series with the branch line at all times, the bleed therefrom will be compensated for by the master controller operation. It is only when a change takes place in the limit controller that it controls with the master controller, to effect the limiting function.

The improved pneumatic control system is shown schematically in FIGURE 2 as applied to a plurality of bleed type controllers each having a force feedback type of operation. The supply conduit is indicated generally at 35 with a restriction 36 in series therewith, the restriction being of a fixed area size relative to the areas of the respective nozzles of the controllers in the pneumatic control circuit such that force feedback type of operation may be provided. This type of controller is described in the copending application of Richard C. Mott, Serial No. 151,087, filed November 8, 1961 on a Pneumatic Control Device now Patent No. 3,174,499, issued Mar. 23, 1965. The individual controllers are shown in part schematically without inclusion of the sensing portion of the device for simplicity since they may take many and different forms. An example of one type of this device is shown in detail in FIGURE 3 to be hereinafter described. Each includes a body 38 with a seat or nozzle 40 therein, the nozzle having cooperating therewith a flapper 42 which is pivoted on the device or otherwise suitably secured to the body 38 for movement relative to the nozzle 40. Each of the bodies 38 have openings 39 therein which terminate in the nozzle 40 with the openings 39 having tension springs 54 therein connected between the flapper 42 and body 38. The springs 54 are shown in compression to indicate one type of sensor motion input, that of variable compression force supplied to the flapper. Associated with the spring is an adjustment means 41 for varying this spring force for setting purposes. Each of the controllers of this type are connected through a conduit 45 to the common piping 48 leading to the restriction and the supply conduits 36, 35 respectively, with a branch line conduit 49 and control device 50 being connected thereto. This provides a series type connection to the various controllers three of which are shown schematically in FIGURE 2 at 51, 52 and 53 with the details of one form of the individual controllers shown in FIGURE 3. It will be recognized that any type of force feedback device may be employed herein to provide this operation inasmuch as the apparatus may be adjusted to provide a given pressure output for a definite set point condition or balance condition. Thus, as will be seen in FIGURE 3, each of the bleed type controllers shown therein includes a valve body 38 with an opening 39 therein terminating in the nozzle 40 which defines with the flapper 42 the bleed type valving. The flapper is the lapped flat plate type member which is shown herein as pivoted on the valve body as at 44 and being secured thereto through suitable means such as screw means 46. The inlet to the valve body is through a port 45 which includes a recess 48 having the filter 49 therein leading to the opening 39 in the valve body. Positioned within the opening 39 defining the nozzle 40 is the spring means indicated at 54, the spring applying a force on the under side of the flapper 42 to cooperate with the pressure therein and apply force on the flapper acting against the input force applied from the sensing portion of the apparatus, as will be later defined. Spring means 54 is shown in compression herein to accommodate a compression force input, as distinguished from the disclosures in FIGURE 2.

In the bleed type controller, the flapper 42 has associated therewith, an adjustment or setting means for the spring 54 which differs from that shown in FIGURE 2. Thus the flapper has suitably secured thereon a flange 55 having a threaded aperture 60 which mounts an adjustment stud 62 threaded into the aperture 60 and flange 55 and bearing against the movable spring member 65 of an expansion element 70 having a cup shaped frame 71 and a flexible diaphragm 72 secured therein to define a motive chamber with a thrust pin 74 attached to the diaphragm member and bearing against the spring member 65. This assembly of the expansion element is mounted on a supporting bracket 78 for the controller, the bracket having a baffle section 79 therein and fitting over the valve body 38 of the controller at one extremity. A passage 80 in the baffle 79 permits passage of the thrust pin 72 to engage the movable spring member 65 of the expansion element so that the flapper will be moved or urged by the expansion member. Connected with the expansion member is a capillary 82 and a remote fill bulb member 85 to define the closed thermal system controlling the valve through its expansion member 70 to provide the input force against the flapper 42 which acts against a spring and the pressure on the under side of the flapper to establish a branch line output pressure on the conduit 45 for control purposes.

While there is shown herein a closed thermal system operating this valve member, the flapper may be operated through a suitable linkage from a rod and tube type thermostat of the conventional type which is shown schematically in FIGURES 1 and 4. For purposes of present disclosure, this controller is identified in FIGURE 2 by the numeral 51 with the details of the sensor being omitted for simplicity. Similar sensing units indicated by numbers 52 and 53 are shown in FIGURE 2 each having basically the same type of structure and having the same or similar type of sensing elements for applying tension forces to the flapper for operating the flapper nozzle to provide the force feedback type of operation. The main feature of the control circuit is the fact that these force feedback sensors permit establishment of a branch pressure at a balance condition or setting for the individual controller which may be varied depending upon the setting of the springs and the condition sensor associated therewith. Thus as will be seen in FIGURES 2 and 3, the large nozzle flapper type device in a bleed type controller where the ratio of the area between nozzle 40 and line restriction 36 is great, such as greater than 100 to 1, provides a force feedback type of operation in which the device is force balanced. This permits a series connection or common connection of all the nozzles in a single pipe to the supply line conduit 35 or pipe through the restriction 36 and with connection to the device 50 or devices to be operated. In FIGURE 2 only a single device 50 is shown in block form. The characteristic of the force balance type controller regardless of the type of input sensor whether it be closed thermal system, rod and tube or the like, permits the use of these controllers in a series type connection with the following result. If one of the controllers, such as the master controller, as for example, controller 51 in FIGURE 2 is set to balance at some pressure the remaining controllers 52 and 53 are adjusted to balance at pressures above this balance pressure of controller 51. Then the remaining controllers 51 and 52 will normally be sealed tight or closed during the normal operation range of control or device 50. That is their flappers will be pulled down against the nozzle and the forces of the external springs 65 counterbalancing the force of spring 54 in the pressure underneath the nozzle will be greater than the pressure on the underside of the flapper 42 so that the closed condition of the valve will exist as long as the pressure in the conduit 48 is adjusted and held below the set point levels of the controllers 52 and 53. If the pressure in line 48 or the outlet pressure increases due to operation of the controller 51 to a point where it enters the operating range of either of the controllers 51 and 52, the forces under the flappers will tend to overcome the input forces or those forces intending to hold the flapper closed so that one of the additional controls will be brought into effect as the respective control flapper nozzle is opened. This will provide a limit pressure and a limiting action on the operation of the controller 51 since it increases the pressure by closing down on its nozzle and effectively, as its sensing element increases operation in this direction, will be taken out of control and the additional controllers 52 and 53 will limit the control pressure as their operating pressure ranges are reached. This action limits any further increase in pressure in the line 48. These sensors that are shown could be built to sense any medium, such as temperature, pressure, humidity or the like. Any number of sensors can be connected in the series or common and all could be adjusted to different operating limits or ranges. In a normal limiting function if limit condition is reached at any of the secondary or limiting sensors, that sensor will assume control through variation in input force to its flapper to open the flapper nozzle and it or the effect of the condition will limit the condition if the apparatus is involved in a controlling system. In an indicating system it would produce an alarm if the apparatus associated with a detection type system is operated.

In FIGURE 4, this improved pneumatic control apparatus is shown applied to a unit type ventilating controller for explanation purposes. Thus, the unit ventilator has a conventional housing or casing 102 with a fresh air 103 and a return air 104 inlet therein and a discharge opening 105 at the opposite extremity of the casing. Positioned within the casing 102 is the conventional heat exchanger or coil 110 through which a fluid medium or temperature changing medium flows from a pipe or conduit indicated at 112 being controlled by a valve 114 connected in the pipe. Similarly, air flow into the mixing casing or chamber is controlled by the position of the pair of damper blades 118 operated through a suitable linkage 120 by an actuator 122. Positioned within the casing is a conventional circulating means or fan 125 shown schematically. Control of the dampers and the fluid through the exchanger coil is effected by means of the pneumatic temperature control system having the master controller or room sensor 130, shown here as a remote bulb type element, which is connected in series into the pneumatic control line 135 having a restriction 136 therein and leading to a supply conduit 140. This control conduit 135 is connected to a low temperature limit controller 150, which is a force balance bleed type limit controller shown in block with its sensing element 152 positioned at the discharge grill or opening 105 of the casing 102 of the ventilator, sensing discharge temperature of the air discharged from the heat exchanger 110. In addition to this limit controller 150, a second low temperature limit controller 165 is connected to the conduit 135 which is the same type as the rod and tube unit 150 and is the input air sensor or low limit controller with its sensing element 166 positioned in the fresh air input 103 to the casing 102. These units are all connected in series, that is the nozzles are all connected in common to the conduit 135 beyond the restriction 136 and hence individually may establish a limit or reduce pressure therein for actuation of the devices to be actuated. In this disclosure, two such devices are shown, one being the pneumatic type actuator shown schematically at 170 operating the valve 114 in the heat exchange line 112 which operates to open valve 114 upon a fall in line pressure and the second being the pneumatic actuator 175 operating through the damper linkage 120 to the dampers 118 associated with the fresh air or return air inlets 103, 104 of the casing 102, to close the fresh air damper and open the return air damper upon a fall in control pressure from a predetermined value. Actuator 175 also has connected thereto an electric limiting relay 180 shown in block, which is electrically connected by means of conductors 182 to the electric motor of the circulator 125. This electric relay 180 operates as an additional limit control on the damper operator to reduce control air pressure in the event of electric power failure to the circulator causing the dampers to be moved to a position where the fresh air input would be closed. In this type of control circuit, the discharge air sensor or limit controller 150 and the fresh air input controller 165 would be adjusted to be closed at a pressure level higher than the normal operating pressure range of the master sensor or controller 130 whose sensing element could be positioned in the space to be air conditioned by the unit ventilator 102. The bulb 185 or the sensing portion of the master controller 130 would be positioned in the space or in the return air line to the mixing casing 102 to effectively sense room temperature. The normal operating pressure of this controller would be adjusted so that it would effect control of or opening of the valve 114 and operation of the damper motor to a position in which the fresh air damper is closed with a fall in control air pressure for a normal operation of controller 130 sensing a fall in room temperature. During this sequence of operation the bleed nozzle or flapper nozzle configuration of the controllers 150, 165 will remain closed through the adjustment of their internal springs to respond only to the limit conditions they are to sense. Thus, depending upon which limit condition is reached the discharge air stat 150 or the inlet air stat 165, will take over from the master controller 130 and limit pressure in the control air line to provide a predetermined operation of the devices, that is the valve and motor 170 or the damper motor 122. Thus for example in the event that a limit is reached during normal operation of the apparatus, such as the outside air sensor sensing extremely cold air and requiring operation of the limiting function to prevent freeze up of the coils, this controller would establish a pressure to close the outdoor damper. The same operation could be attributed to the discharge air sensor 150 with the purpose of the limiting apparatus being to prevent discharge of uncomfortably cooled air to the space to be air conditioned. Thus in the normal operation of the apparatus, the limiting controllers would be set only for minimum temperature conditions and would assume control and act upon the valve and damper motor only when the minimum conditions for which they are set are reached. The valves 150, 165 also can respond to an increase in branch line pressure to effect a limit on this pressure independent of the operation of their sensors.

In the present embodiment this type of limit action protects against malfunction of the primary control 130 in rising beyond the normal control range.

Further such apparatus may be employed in connection with indicating systems such as fire alarm systems wherein each sensor is set at a different pressure level so that selectively they may provide different pressure outputs to an indicator to indicate wherein the sensor has responded or at what location a sensor has responded for control purposes.

In considering this invention it should be kept in mind that the present disclosure is intended to be illustrative only and the scope of the invention should be determined only by the appended claims.

I claim as my invention:

1. A pneumatic control system comprising in combination, a pneumatic pressure source, conduit means connected to said pneumatic pressure source and including a restriction, a control device to be operated from said source, a branch line conduit connected to said first named conduit beyond said restriction and to said control device to be actuated from said pneumatic pressure source under varying pressure conditions, a plurality of bleed type controllers connected in series circuit with said first named conduit, each of said controllers having a bleed type nozzle flapper means directly connected to said conduit and with a large area nozzle compared to the area of said restriction to effect a force balance type of operation at each controller, each of said controllers being set for a different range of operation so that under operating circumstances all except one controller will be sealed at its nozzle flapper means, said remaining controllers being so adjusted as to open at predetermined conditions to take over control from said one controller to cause pressure to decrease to said control device and effect control of the pressure in said conduit to said control device.

2. A pneumatic control system comprising in combination, a pneumatic pressure source, conduit means connected to said pneumatic pressure source and including a restriction, a control device to be operated from said source, a branch line conduit connected to said first named conduit beyond said restriction and to said control device to be actuated from said pneumatic pressure source under varying pressure conditions, a pair of bleed type controllers each having nozzle flappers with the nozzles connected through common conduit means to said branch conduit, said bleed type controllers having inherent force feedback type of operation on said flappers to provide for varying pressure outputs at said nozzle means with given conditions sensed at said named controllers, each of said controllers being set for different ranges of operation so that under normal operating conditions one of said controllers will be sealed at its nozzle flapper and the other will be operative to adjust the pressure to said control device, said other of said controllers being so adjusted that upon a condition it will decrease to said control device, said second named controller also being operative to take over control and effect control of pressure to said control device when said first named controller establishes a predetermined pressure at said control device.

3. A pneumatic control system comprising in combination, a pneumatic pressure source, conduit means connected to said pneumatic pressure source and including a restriction, a control device to be operated from said source, a branch line conduit connected to said first named conduit beyond said restriction and to said control device to be actuated from said pneumatic pressure source under varying pressure condition, at least two bleed type controllers each having nozzle flappers with the nozzles connected through common conduit means to said branch conduit, said bleed type controllers having inherent force feedback type of operation on said flappers to provide for varying pressure outputs at said nozzle means with given conditions sensed at said named controllers, each of said controllers being set for different ranges of operation so that under normal operating conditions at least one of said cotrollers will be sealed at its nozzle flapper and the other will be operative to adjust the pressure to said control device, the remaining controllers being adjusted to open at pressure conditions above the normal set point pressure of said one controller and being normally operative or responsive to conditions which will provide a pressure output to said control device to decrease pressure to said control device.

4. A pneumatic control system comprising in combination, a pneumatic pressure source, conduit means connected to said pneumatic pressure source and including a restriction, a control device to be operated from said source, a branch line conduit connected to said first named conduit beyond said restriction and to said control device to be actuated from said pneumatic pressure source under varying pressure conditions, a pair of sensor controllers connected to said branch line conduit to effect control of said control device, said sensor controllers being of the inherent force feedback type, one of said sensor controllers being set to balance for a given condition sensed to provide a predetermined pressure output in said branch line conduit, the remaining sensor controller being so adjusted to sense a different condition and be operated at a higher pressure in said branch line conduit than said one of said sensor controllers so that under normal conditions it is closed and has no effect on the pressure in said branch line conduit, said last named sensor controller upon sensing said different condition becoming effective to take over control of said control device.

5. A pneumatic control system comprising in combination, a pneumatic pressure source, and conduit means connected to said pneumatic pressure source and including a restriction, at least one control device to be operated from said pressure source, a branch line conduit connected to said first named conduit beyond said restriction and to said control device to be actuated from said pneumatic pressure source under varying pressure conditions, at least two sensor controllers connected to said branch line conduit to effect control of said control device said sensor controllers being of the inherent force feedback type, one of said sensor controllers being set to balance for a given condition sensed to provide a predetermined pressure output in said branch line conduit, the remaining sensor controllers being so adjusted to respond to different conditions and operate at a higher pressure in said branch line conduit than said one of said sensor controllers so that under normal conditions it is closed and has no effect on the pressure in said branch line conduit, one of said remaining sensor controllers sensing selectively said different condition becoming effective to take over control of said control device.

6. A pneumatic control system comprising in combination, a pneumatic pressure source, conduit means connected to said pneumatic pressure source and including a restriction, a control device to be operated from said source, a branch line conduit connected to said first named conduit beyond said restriction and to said control device to be actuated from said pneumatic pressure source under varying pressure conditions, a plurality of bleed type controllers connected in series circuit with said first named conduit, each of said controllers having a bleed type nozzle flapper means directly connected to said conduit and with a large area nozzle compared to the area of said restriction to effect a force balance type of operation at each controller, each of said controllers being set to respond to different conditions and having different pressure outputs for the controller settings such that under normal operating circumstances only one of said controllers will be operative to provide a pressure output to said control device and the remaining controllers will be sealed at the nozzle, the remaining controllers being adjusted to open at different conditions to take over control and effect a limit on the operation of said control device.

References Cited by the Examiner

UNITED STATES PATENTS 2,913,183  11/1959  Loepsinger _____ 236—79 X

ISADOR WEIL, *Primary Examiner.*